US009213715B2

(12) United States Patent
Chambliss et al.

(10) Patent No.: US 9,213,715 B2
(45) Date of Patent: *Dec. 15, 2015

(54) DE-DUPLICATION WITH PARTITIONING ADVICE AND AUTOMATION

(71) Applicant: International Business Machines Corporation, Armonk, NY (US)

(72) Inventors: David D. Chambliss, Morgan Hill, CA (US); Mihail C. Constantinescu, San Jose, CA (US); Joseph S. Glider, Palo Alto, CA (US); Bhushan P. Jain, Jalgaon (IN); Maohua Lu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 256 days.

This patent is subject to a terminal disclaimer.

(21) Appl. No.: 13/909,050

(22) Filed: Jun. 3, 2013

(65) Prior Publication Data

US 2014/0359244 A1 Dec. 4, 2014

(51) Int. Cl.
*G06F 3/06* (2006.01)
*G06F 17/30* (2006.01)
*G06F 11/14* (2006.01)

(52) U.S. Cl.
CPC ........ *G06F 17/30156* (2013.01); *G06F 3/0604* (2013.01); *G06F 3/0641* (2013.01); *G06F 3/0647* (2013.01); *G06F 3/0683* (2013.01); *G06F 11/1453* (2013.01)

(58) Field of Classification Search
None
See application file for complete search history.

(56) References Cited

U.S. PATENT DOCUMENTS

| 5,990,810 | A | 11/1999 | Williams |
| 7,814,129 | B2 | 10/2010 | Williams |
| 8,086,799 | B2 | 12/2011 | Mondal et al. |
| 8,204,866 | B2 | 6/2012 | Chaudhuri et al. |
| 8,209,334 | B1 | 6/2012 | Doerner |
| 8,280,926 | B2 | 10/2012 | Sandorfi et al. |
| 8,285,681 | B2 | 10/2012 | Prahlad et al. |
| 8,688,651 | B2 * | 4/2014 | Kennedy et al. .............. 707/692 |
| 8,805,796 | B1 * | 8/2014 | Hu et al. ....................... 707/692 |
| 2003/0018878 | A1 * | 1/2003 | Dorward et al. .............. 711/216 |
| 2009/0043983 | A1 * | 2/2009 | Yagawa ........................ 711/170 |
| 2010/0153375 | A1 * | 6/2010 | Bilas et al. .................... 707/723 |
| 2010/0332452 | A1 | 12/2010 | Hsu et al. |
| 2011/0099351 | A1 | 4/2011 | Condict |

(Continued)

OTHER PUBLICATIONS

Lu et al., Insights for Data Reduction in Primary Storage: A Practical Analysis, Proceedings of the 5th Annual International Systems and Storage Conference, ACM, Jun. 4, 2012.

(Continued)

*Primary Examiner* — Kaushikkumar Patel
(74) *Attorney, Agent, or Firm* — Lieberman & Brandsdorfer, LLC

(57) ABSTRACT

Migrating a sub-volume in data storage with at least two de-duplication domains, each of the domains having at least one sub-volume. A first sub-volume is assigned to a de-duplication domain and a first content summary is computed for the first sub-volume. Similarly, a second sub-volume is assigned to a second de-duplication domains and a second content summary is computed for the second sub-volume. A first content affinity is calculated between the first sub-volume and a third sub-volume, and a second content affinity is calculated between the second sub-volume and the third sub-volume. A domain placement is selected for the third sub-volume based on comparison of the first content affinity and the second content affinity.

13 Claims, 7 Drawing Sheets

(56) References Cited

U.S. PATENT DOCUMENTS

| 2011/0173197 | A1 | 7/2011 | Mehta et al. |
| 2011/0302163 | A1 | 12/2011 | Rhinelander et al. |
| 2012/0023112 | A1 | 1/2012 | Levow et al. |
| 2012/0191670 | A1* | 7/2012 | Kennedy et al. .............. 707/692 |
| 2013/0018854 | A1* | 1/2013 | Condict ........................ 707/692 |
| 2013/0151482 | A1* | 6/2013 | Tofano ......................... 707/692 |
| 2013/0311739 | A1* | 11/2013 | Kawakami et al. ........... 711/165 |
| 2014/0195499 | A1* | 7/2014 | Amit et al. .................... 707/693 |

OTHER PUBLICATIONS

Lu et al., Content Sharing Graphs for Deduplication-Enabled Storage Systems, Algorithms 2012, 5, 236-260, Apr. 2012.

* cited by examiner

DE-DUPLICATION WITH PARTITIONING ADVICE AND AUTOMATION

BACKGROUND

The present invention relates to dividing address space into sub-volumes and content affinity between the sub-volumes. More specifically, the invention relates to computing content affinity between sub-volumes, and using this computed content affinity for data placement.

De-duplication reduces the number of data storage devices that need to be used to store a given amount of information. It operates by detecting repetition of identical chunks of data, and in some instances replacing a repeated copy with a reference to another copy of the same content. De-duplication system also provides for reconstructing the original form of a given piece of content which has been stored in a compressed manner. References are used to locate the original copies of the data so that the full-length form of the desired content can be delivered.

Systems employing de-duplication can experience performance issues when applied to large-scale storage systems. To resolve this issue, systems built for large-scale storage are generally designed to adopt a scale-out strategy such that separate hardware can operate independently on separate sub regions of the storage. Operating independently is necessary so that messaging overheads, lock delays, and blocking waits do not grow too large. However, de-duplication imposes a limitation for a dependent operation across its entire span. This limitation can create blocking delays that can degrade scalability.

BRIEF SUMMARY

This invention comprises a system and article for assigning a sub-volume to a de-duplication domain.

In one aspect, a system and computer program product are provided for selecting a domain placement for a set of sub-volumes. The placement selection employs several computations, including a first content summary for a first set of sub-volumes of a first de-duplication domain, second content summary for a second set of sub-volumes of a second de-duplication domain, and a third content summary for a third set of sub-volumes. Based on the computations, a first content affinity between the first set and the third set and a second content affinity between the second set and the third set is calculated. Domain placement is selected for the third set based on comparison of the first and second content affinity.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
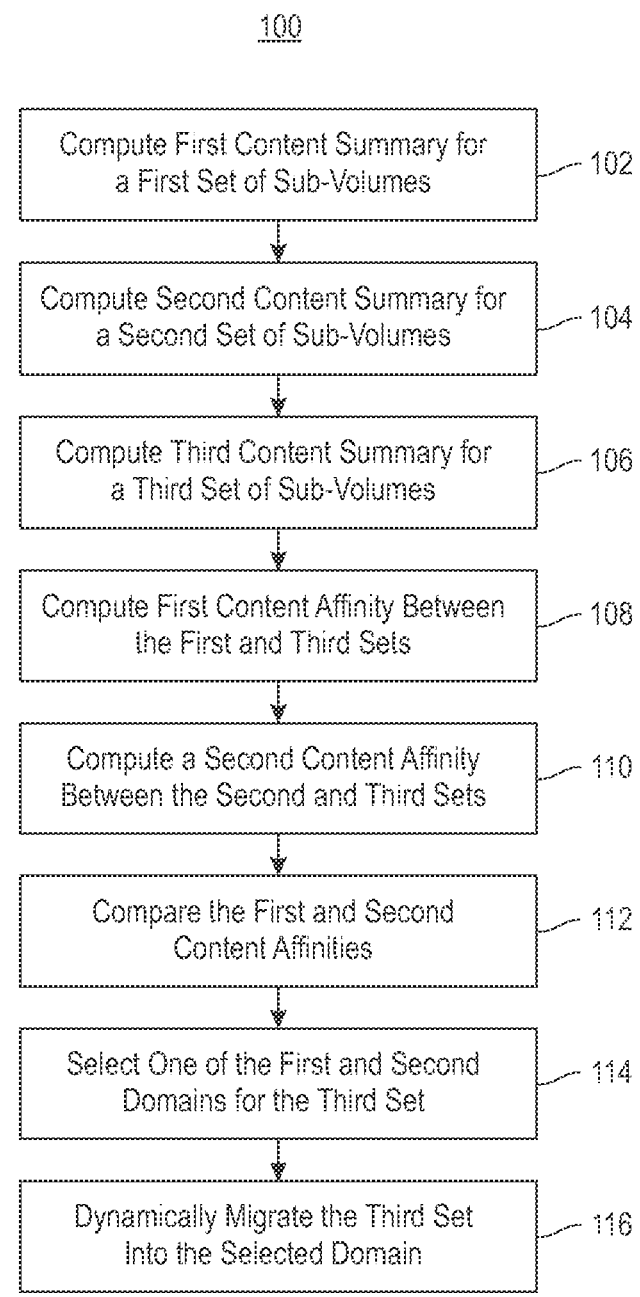
FIG. 1 depicts a flow chart for assigning a set of sub-volumes to a de-duplication domain.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

The address space for data is divided into sub-volumes, also referred to herein as containers. A sub-volume is a data storage location for systematically storing and retrieving data; the container can be physical or logical. Each available data address belongs to exactly one sub-volume. Different sub-volumes keep different pieces of data separate. Each sub-volume is associated with a commonality of usage of the data. For example, in one embodiment, different uses may have different sub-volumes. The division of the data space into sub-volumes applies to data already present, and will also apply to data created or received in the future. Sub-volumes are used so that a manageable number of units can be operated on and statistically analyzed. As will be described in detail below, each sub-volume will be assigned into a single de-duplication domain.

One or more sub-volumes of data storage are assigned to a single de-duplication domain, hereafter referred to as a domain. In one embodiment, the domain is a physical region of data storage, or in one embodiment, a data storage device. Duplicate content in two sub-volumes, as found by de-duplication, arises because of the relationship between the sub-volumes. Content in the sub-volumes is examined to estimate the presence or absence of common content, and placement is decided generally to allocate sub-volumes with much common content to the same domain while allowing sub-volumes with little or no common content to be allocated to separate domains. If the usage of a given sub-volume is stable, then sub-volumes measured to have little common content will likely not be generating common content in the future and thus little de-duplication opportunity will be had by placing them in separate domains.

FIG. 1 is a flow chart (100) illustrating assignment of a set of sub-volumes to a domain based on content affinity. For descriptive purposes, a first set of sub-volumes is assigned to a first domain and a second set of sub-volumes is assigned to a second domain, with the first and second domains being separate. A third set of sub-volumes is introduced for assignment to one of the first or second domains. A first content summary for the first set of sub-volumes is computed (102) and a second content summary for the second set of sub-volumes is computed (104). A third content summary for the third set of sub-volumes is computed (106). The content summaries are used to assess content affinity between the sets of sub-volumes. A first content affinity is computed between the first sub-volume set and the third sub-volume set (108). Similarly, a second content affinity between the second sub-volume set and the third sub-volume set is computed (110). Thereafter, the first content affinity is compared to the second content affinity (112). The comparison provides a basis for assignment of the third sub-volume set to one of the first and second domains. One of the first or second domains is selected for the third sub-volume set (114) and the third sub-volume set is dynamically migrated into the selected domain (116). Accordingly, the content affinities between sets of sub-volumes in different domains are compared and used as a basis for selection and migration of the third sub-volume set.

Figure 2:
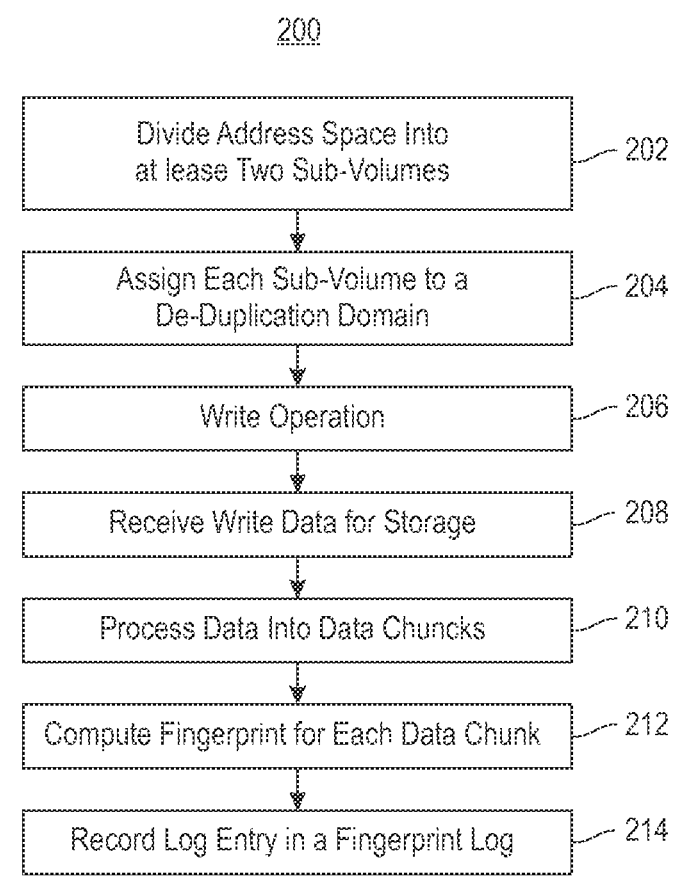
FIG. 2 depicts a flow chart for computing fingerprints for divided write data.

Digital fingerprinting, hereinafter referred to as fingerprinting, is the identification of large data files or structures using truncated information. A fingerprinting algorithm reduces a large data set to promote efficient identification and search protocols. FIG. 2 is a flow chart (200) illustrating a method for logging fingerprint data in storage. Address space, also referred to as name space used to identify units of data to be stored and retrieved, is divided into at least two sub-volumes (202). In one embodiment, the entire address space is not divided into sub-volumes to enable the creation of future sub-volumes. For example, sub-volumes may be created to accommodate the creation of SCSI LUNs, where each sub-volume contains multiple SCSI LUNs or is part of an SCSI LUN. In one embodiment, space is allocated through assignment and/or the increase of space quotas for directories within a set of mountable file systems such that each sub-volume is an entire mountable file system, a subset of high-level directories within the system, or a group of file systems. In one embodiment, sub-volumes are divided by the data of an owner, such that data of different owners is assigned to different sub-volumes. In one embodiment, each sub-volume contains a virtualizer sub-volume, wherein a virtualizer sub-volume is a sub-volume restricted by a virtualizer. Accordingly, an address space of data is divided into multiple sub-volumes.

Each sub-volume is assigned to a de-duplication domain (204). In one embodiment, sub-volumes can be assigned such that separate sub-volumes can be assigned to different de-duplication domains through the operation of a virtualizer. In one embodiment, the assignment of data elements to different de-duplication domains is restricted by the virtualizer such that certain sub-volumes must be assigned to similar domains. Accordingly, each sub-volume is assigned to one domain.

Data is received for storage (208) responsive to a write operation (206). In one embodiment, the write operation is associated with a sub-volume when it occurs. The data is processed into data chunks (210), and a fingerprint is computed for each data chunk (212). In one embodiment, writes are logged for generation of a content feature summary and a log entry records the address of a write with an abbreviated form of a fingerprint. The log entry is recorded in a fingerprint log (214). In one embodiment, the addresses and fingerprints are stored in a directory for referencing fingerprints e.g. to identify fingerprint duplicates. Accordingly, as the write operation occurs, the data is processed and stored in a sub-volume, and the processing includes computation of a fingerprint of each data chunk and recordation of the fingerprints in a directory.

Logging of write operations and associated fingerprints is used to generate content feature summaries. A log entry records the address of a write with an abbreviated form of the fingerprint. When one host write operation maps to multiple data chunks, each data chunk is logged as a separate write. In one embodiment, the de-duplication domains supply the fingerprints and the chunk offset as a result of the de-duplication operation. In another embodiment, the fingerprints entered into the log are generated separately. In one embodiment, it is not necessary that the fingerprints match those used in the de-duplication domains, since content similarity measured with one chunking approach and one fingerprint method will correlate with the content similarity that yields de-duplication effectiveness even with a different chunking and fingerprint mechanism. Similarly, in one embodiment, a time stamp may be included in the log entry so that time order can be identified.

Placement of sub-volumes into domains is periodically reassessed to improve de-duplication effectiveness. Reassessments may be conducted for various reasons, including, but not limited to, a change in data content, a recently created sub-volume, and/or a need to re-balance de-duplication domains. In one embodiment, the de-duplication domain corresponds to a set of physical resources, such as a storage controller having nodes with dedicated storage locations. Hosting a sub-volume on a given domain places demands on those resources. In one embodiment, it may be necessary to maintain the demands below a limit, or to drive migration of sub-volumes away from certain domains.

Figure 3:
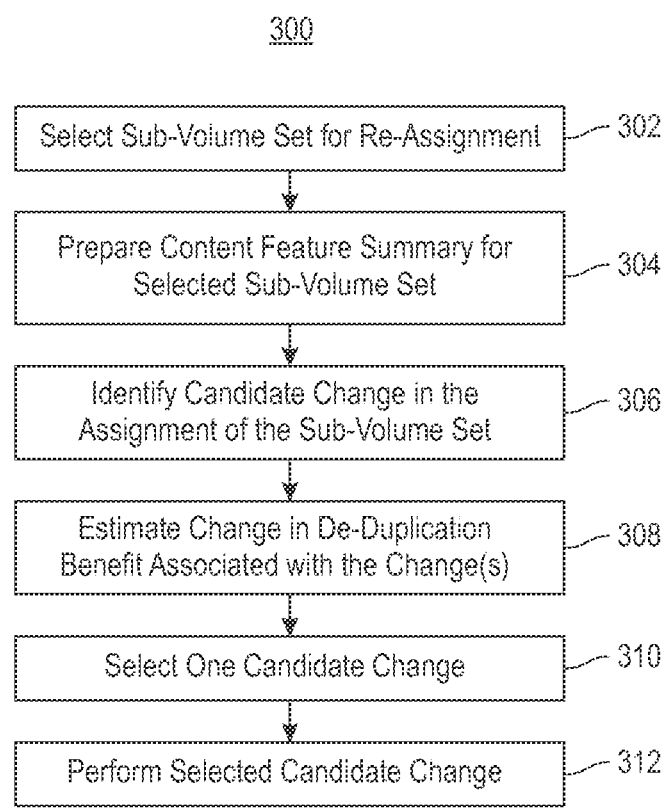
FIG. 3 depicts a flow chart for executing candidate changes.

FIG. 3 is a flow chart (300) illustrating a method for re-assessment of assignment of sets of sub-volumes to de-duplication domains. A sub-volume set is selected for re-assignment (302), and a content feature summary is prepared for the selected sub-volume set (304). In one embodiment, the fingerprint log is the primary input for the summary. The content feature summary consists generally of a subset of truncated fingerprints selected from the log by a range selection on a fingerprint numerical value. Candidate changes in the assignment of the sub-volume set to a domain are identified (306), together with an estimate of the change in de-duplication benefit associated with the change(s) (308). In one embodiment, candidate changes are identified by randomly selecting a sample set of sub-volumes and domains for the assignment of the set of sub-volumes and regarding each move of a single sub-volume set as a candidate change. In one embodiment, the random selection uses non-uniform weighting based on a volume of new writes, such that sets of sub-volumes containing new content have a greater likelihood of evaluation. In one embodiment, where balance constraints are valued, candidate changes are selected as combinations of single moves for balance preservation. For example, the candidate changes may include sets of sub-volume pairs that switch places as a candidate change. In one embodiment, the de-duplication benefit takes into account migration costs. Accordingly, candidate changes are identified and an estimated benefit is computed using the content feature summaries.

Each candidate change comprises one or more sub-volume set reassignments, where a sub-volume set reassignment identifies a specific set of sub-volumes and the domain into which it would be moved. In one embodiment, the net benefit estimate(s) might be adjusted to reflect factors such as migration cost and operational effects apart from de-duplication benefit. One candidate change is selected (310) and performed (312). In one embodiment, the candidate change involves change to internal metadata used in each de-duplication domain, and may also include moving units of data across storage devices. In one embodiment, the re-assignment is manual and with an outcome of the evaluation being a message with advice on which re-assignment(s) is recommended. Following execution of the change at step (312), additional candidate changes may be evaluated and executed in the context of the selected change having been performed.

In one embodiment, a de-duplication score and/or a systems-benefit score is calculated. The de-duplication score for a candidate change is the difference between the total content affinities across all domains between the set of sub-volumes that are remaining in the domain and the set of sub-volumes that are assigned to the domain, and the total content affinities across all domains between the set of sub-volumes that are remaining in the domain and the set of sub-volumes that are leaving the domain. In one embodiment, the de-duplication score is an estimation of the net increase or decrease in the number of removable duplicates to be found within de-duplication domains responsive to a change. The systems-benefit score for a candidate change is computed by combining its de-duplication score with a score for other systems costs and benefits e.g. the effect on balance of the system and/or the cost of performing a migration. Accordingly, a de-duplication score is calculated for estimation of change of removable duplicates within de-duplication domains and a systems-benefit score is calculated for calculating a perceived benefit within the system for a candidate change.

A set of candidate changes may be evaluated and/or modified in a single stage or it may be evaluated and/or modified in multiple stages. For example, multiple stages may be utilized where a list of candidate changes each includes changes regarding the evaluation of moving a single sub-volume or a single set of sub-volumes, and the systems-benefit scores of the changes are used to select which single sub-volume or single set of sub-volume assignments should be combined into new candidate changes. To facilitate the evaluation of candidates in multiple stages, the candidates may include assignments which formally can be evaluated but which are not realizable in the system e.g. assigning a sub-volume or set of sub-volumes out of a domain but not into another, and/or moving sub-volumes into a non-existent domain, provided the non-realizable candidates are eventually combined into realizable changes.

When performing a multi-stage evaluation, de-duplication scores may be computed with an initial approximate value, before computing a final de-duplication score. For example, an initial selection pass might ignore the de-duplication score and consider other system costs and benefits, or estimates of the de-duplication score in an early stage might use a smaller fingerprint value range of possible fingerprint values initially so as to allow for the evaluation of a larger number of candidate changes. Accordingly, an approximate de-duplication score may be calculated in multi-stage evaluation prior to a more accurately calculated de-duplication score.

Figure 4:
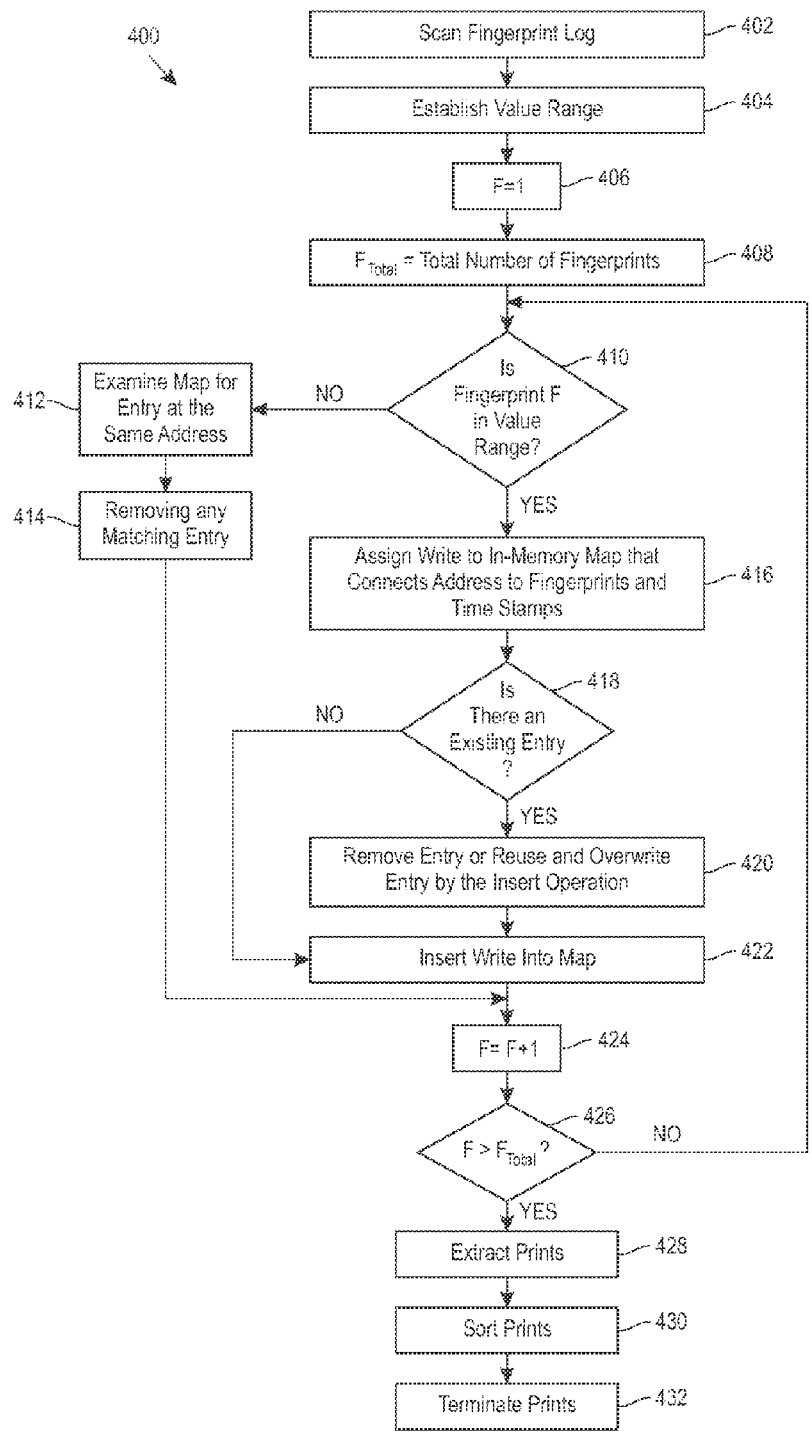
FIG. 4 depicts a flow chart for preparing a content feature summary.

To assess the assignment of sets of sub-volumes as described in FIG. 3 above, at least one content feature summary is generated. FIG. 4 is a flow chart (400) illustrating a method for preparing a content feature summary as a content filtered subset of fingerprints in the fingerprint log. The content feature summary for a sub-volume is computed from the fingerprint log for the sub-volume. In one embodiment, the content feature summary for a set of sub-volumes is computed as the union of the content feature summaries for each sub-volume contained in the set. In one embodiment, the content feature summary for a set of sub-volumes is computed from the union of fingerprint logs for each sub-volume contained in the set. The fingerprint log is scanned (402) and a value range is established (404). The fingerprint log may be scanned as a single step or throughout the process established in FIG. 4 as outlined, such that any step of the process throughout steps (410)-(426) may be enacted responsive to a scan of the fingerprint log. In one embodiment, the fingerprint log is scanned in time order. In one embodiment, the scan of the fingerprint log and steps (410)-(426) are performed progressively in response to entries being added to the fingerprint log (214) so as to reduce the volume of non-scanned log entries that need to be retained. A counting variable F (406) is initialized, where $F_{total}$ is the total fingerprints in the log (408). It is determined if $fingerprint_F$ is in the established value range (410). A negative response is followed by examining a map for a fingerprint entry at the same address (412), and removing any matching entry (414). In one embodiment, a positive response to step (410) is followed by assigning $fingerprint_F$ into an in-memory map that connects addresses to fingerprints as keys and timestamps as values (416). Accordingly, the fingerprint log is scanned and fingerprints are assessed according to whether the fingerprint falls within an assigned value range.

For each fingerprint which is found to be in the value range, it is determined if there is an existing entry for assigning $fingerprint_F$ to the in-memory map (418). A negative response to the determination at step (418) is followed by inserting the $fingerprint_F$ into the map (420), and a positive response to the determination at step (418) is followed by removing the entry from the map or re-using and/or overwriting the entry (422), followed by a return to step (420). Following both step (420) and step (414), the variable F is incremented (424), and it is determined if every fingerprint has been assessed (426). A negative response to the determination at step (426) is followed by a return to step (410) and a positive response to the determination at step (426) is followed by extracting the fingerprints (428) from the in-memory map, sorting the fingerprints (430), and in one embodiment, truncating the fingerprints (432). In one embodiment, the extracted and sorted list constitutes the content feature summary. Accordingly, fingerprints are added to the in-memory map and entries are removed from the map when appropriate, with the fingerprints relating to active data in the sub-volume.

Figure 5:
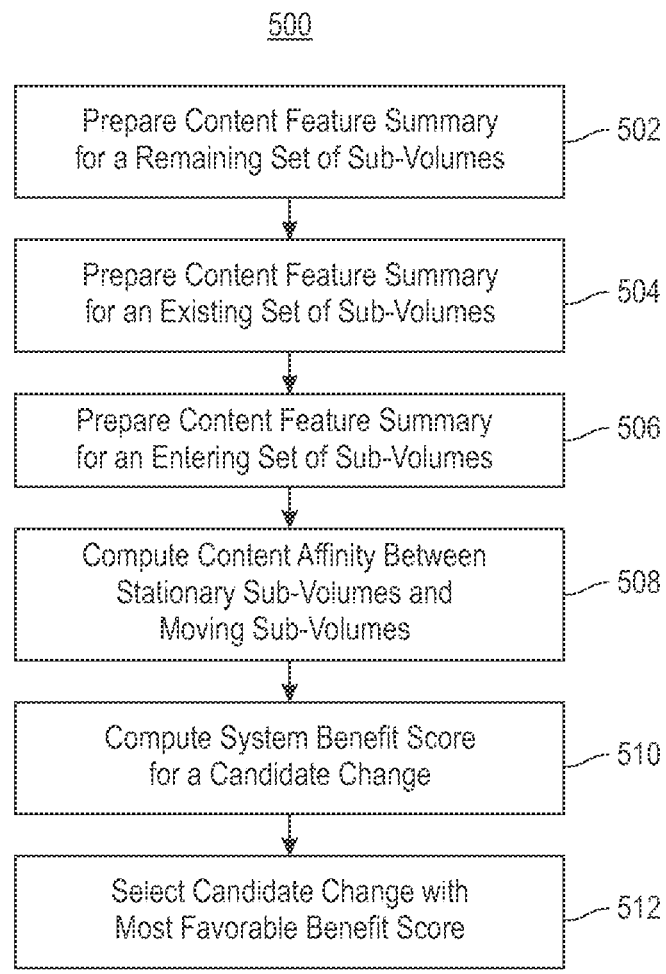
FIG. 5 depicts a flow chart for evaluating candidate changes in the address space.

As sub-volumes are assigned or re-assigned to different domains, the configuration of the domains in the address space changes. FIG. 5 is a flow chart (500) illustrating the evaluation of candidate changes in the address space. For each domain whose content is changed by a given candidate change, a content feature summary is prepared for a set of sub-volumes in a domain that are remaining in the domain (502), a content feature summary is prepared for a set of sub-volumes assigned to a different domain (504), and a content feature summary is prepared for a set of sub-volumes that have been assigned to the domain (506). The content feature summary for a set of sub-volumes is the union of content feature summaries of member sub-volumes. Where a set of sub-volumes is empty, its content feature summary is also empty, and where a set of sub-volumes contains one sub-volume, its content feature summary for the set of sub-volumes is the content feature summary of the sub-volume.

Content affinity is the measurement for a group or set of sub-volumes from a collection of content feature summaries. The content affinity is computed between the sub-volumes that are stationary and the sub-volumes that have been transferred to a different domain (508). In one embodiment, the content affinity is computed by counting the fingerprints in the intersections of the content feature summaries, and mathematically adjusting them for the value range of the intersection. The content affinity of any sub-volume set with an empty sub-volume set is zero. The de-duplication score for a candidate change is the total across all domains of the content affinities between the stationary set of sub-volumes and the set of sob-volumes to be transferred less the total across all domains of the content affinities between the stationary set of sub-volumes and the set to be transferred. In one embodiment, the de-duplication score is an estimate of the net increase or net decrease in the number of removable duplicates to be found within de-duplication domains in the change were to take place.

A systems benefit score is computed for a candidate change (510). In one embodiment, the system benefit score is a combination of the de-duplication score for the candidate change with a score for other system costs and benefits, such as its effect on balance and the cost of performing the migration. In one embodiment, one candidate change with the most favorable systems benefit score is selected to be performed (512). A set of candidate changes may be evaluated and modified in multiple stages. For example, a list of candidate changes each consisting of moving a single sub-volume might be evaluated, and their system benefit scores might be used to select which single sub-volume moves should be combined into new candidates which comprise multiple moves. The multiple move candidates then are evaluated as described above. To facilitate such an evaluation, the initial candidates might include moves which formally can be evaluated but which are not attainable in the system, provided the non-attainable candidates are combined in the end into realizable changes.

Figure 6:
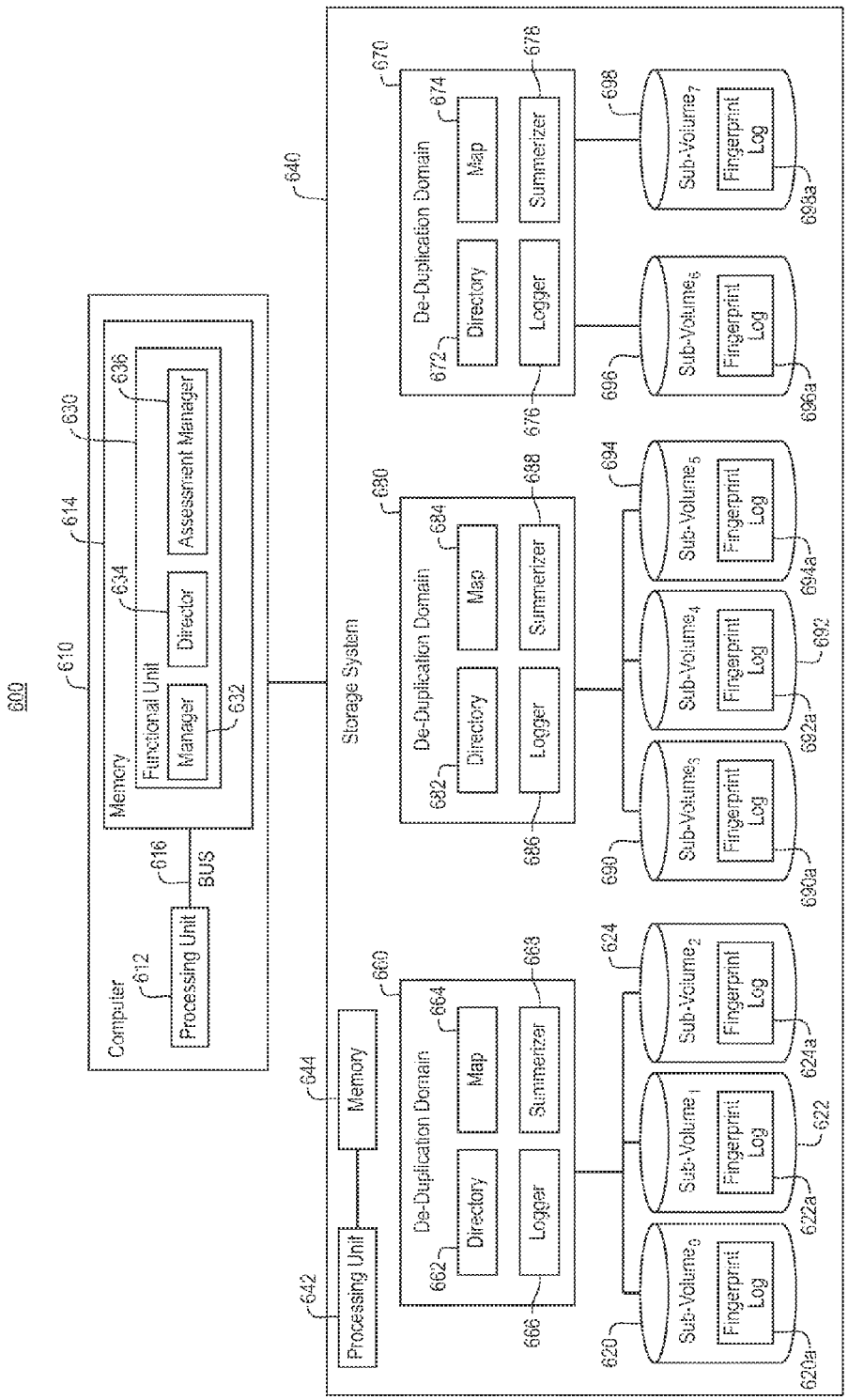
FIG. 6 is a block diagram depicting a system for assigning a sub-volume to a de-duplication domain.

The processes shown in FIGS. 1-5 may be embodied as hardware components. FIG. 6 is a block diagram illustrating tools embedded in a computer system to support data de-duplication and partitioning. As shown, the system includes a computer (610) provided with a processing unit (612) in communication with memory (614) across a bus (616). A data storage system (650) is provided in communication with the computer (610) to support data de-duplication, partitioning, and re-assignment. The data storage (640) is provided with a processing unit (642) in communication with memory (644). In one embodiment, the data storage (640) may be remote with access to the storage provided across a network.

The computer (610) includes a functional unit (630) having one or more tools to support the functionality of the containers with respect to data de-duplication and partitioning. The tools embedded in the functional unit (630) include, but are not limited to, a manager (632), a director (634), and an assessment manager (636).

As shown, the storage system (640) is shown with a processing unit (642) in communication with memory (644), and three de-duplication domains (660), (670), and (680). Although three de-duplication domains are shown, the invention should not be limited to the illustrated quantity. Each of the de-duplication domains (660), (670), and (680) are shown with a directory (662), (672), and (682), respectively, and a map (664), (674), and (684), respectively. In addition, each of the de-duplication domains (660), (670), and (680) are provided with a logger (666), (676), and (686), respectively, and a summarizer (668), (678), and (688)). Each of the directories (662), (672), and (682) records the physical locations at which data chunks with given fingerprint values are stored. In one embodiment, each directory records a plurality of physical locations and fingerprints for a plurality of write operations. Similarly, each of the maps (664), (674), and (684) connects the addresses of write operations to the locations where the corresponding data chunks are stored. Each of the de-duplication domains are shown with a plurality of sub-volumes. For descriptive purposes, the quantity of sub-volumes per domain is not limiting. De-duplication domain (660) is in communication with sub-volume$_0$ (620), sub-volume$_1$ (622), and sub-volume$_2$ (624). Each of the sub-volumes has a finger print log (620$a$), (622$a$), and (624$a$), respectively, and an assigned address space (not shown). Similarly, de-duplication domain (680) is in communication with sub-volume$_3$ (690), sub-volume$_4$ (692), and sub-volume$_5$ (694). Each of the sub-volumes has a finger print log (690$a$), (692$a$), and (694$a$), respectively, and an assigned address space (not shown). Similarly, de-duplication domain (670) is in communication with sub-volume$_6$ (696) and sub-volume$_7$ (698), with each of the sub-volumes having respective finger print logs (696$a$) and (698$a$). The data in a sub-volume may be subject to de-duplication processing in conjunction with itself and with the data in other sub-volumes in the same domain, and only in the same domain. In one embodiment, some volumes in a domain are not subjected to de-duplication processing. In one embodiment, there is a domain none of whose volumes are subjected to de-duplication processing.

Different domains keep different pieces of information separate. In one embodiment, each sub-volume is associated with a commonality of usage of data. For example, in one embodiment, different uses may have different sub-volumes. The tools in the form of the manager (632), director (634), and assessment manager (636) function to select a domain for data associated with a write operation or to select a domain for a set of sub-volumes based on comparison of content affinity. The tools in the form of the summarizers function to compute a content summary for each of the set of sub-volumes, and the loggers function to process received data into data chunks and to compute a fingerprint for the data chunk. In addition, the loggers record the fingerprint and an address for the data chunk in the fingerprint log for the sub-volume in receipt of the data. In one embodiment, the content summary is limited to each of the considered sub-volumes. The manager (632) functions to compute the content affinity between each of the volumes under consideration to receive data, and the volume or data under consideration for migration. Based on the content affinity, the director (634) selects a domain in the storage system (640) for migration or receipt of data. In one embodiment, the director (634) dynamically migrates the third sub-volume or data under consideration into the selected domain.

The tools shown herein employ the processing unit(s) to support their computations for data migration. As described above in FIGS. 1-5, computations are performed to support the data migration. In addition to the tools described above, an assessment manager (636) is provided to support the data migration. Specifically, the assessment manager (6363) employs the processing unit (612) to assess selection of the domain for migration of data. The assessment manager (636) prepares a content feature summary for each group (or set) of sub-volumes, with the content feature summary being a content filtered subset of fingerprints for an associated set of sub-volumes. The content filtered subset of fingerprints includes a selection of fingerprints in an interval associated with active data in a select set of sub-volumes. In one embodiment, the content filtered subset selects a subset of possible fingerprint values, such as a mathematical interval. In one embodiment the assessment manager (636) obtains content feature summaries for sets of sub-volumes from the summarizers (668), (678), (688). Received data may be assessed for placement in a specific volume, and a sub-volume may be independently assessed for migration. With respect to migration, the assessment manager (636) re-assesses assignment of one of the sub-volumes or one set of sub-volumes to one of the domains. The re-assessment includes identification of a select sub-volume or select set of sub-volumes and domain for re-assignment and computation of a change in de-duplication benefit with the re-assignment. In addition, the assessment manager (636) adjusts the computed change to reflect migration cost.

As identified above, the manager (632), director (634), and assessment manager (636) are shown residing in the functional unit (630) of the computer (610). Similarly, the logger and summarizers are shown residing local to each domain in the storage system (640). In one embodiment, the functional unit (630) and its associated tools (632)-(636) may reside as hardware tools external to memory (614). In another embodiment, the tools (632)-(636) may be implemented as a combination of hardware and software in a shared pool of resources. Similarly, in one embodiment, the tools (632)-(636) and/or (666) and (668), (686) and (688), and (676) and (678) may be combined into a single functional item that incorporates the functionality of the separate items. As shown herein, each of the tools (632)-(636) are shown local to one computer system (610), and the loggers and summarizers are shown local to each of their respective domains. However, in one embodiment they may be collectively or individually distributed across a shared pool of configurable computer resources and function as a unit to support data migration. Accordingly, the tools may be implemented as software tools, hardware tools, or a combination of software and hardware tools.

Furthermore, the described features, structures, or characteristics may be combined in any suitable manner in one or more embodiments. Examples of the managers have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The functional unit described above in FIG. 6 has been labeled with tools. The tools may be implemented in programmable hardware devices such as field programmable gate arrays, programmable array logic, programmable logic devices, or the like. The tool may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of managers, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 7:
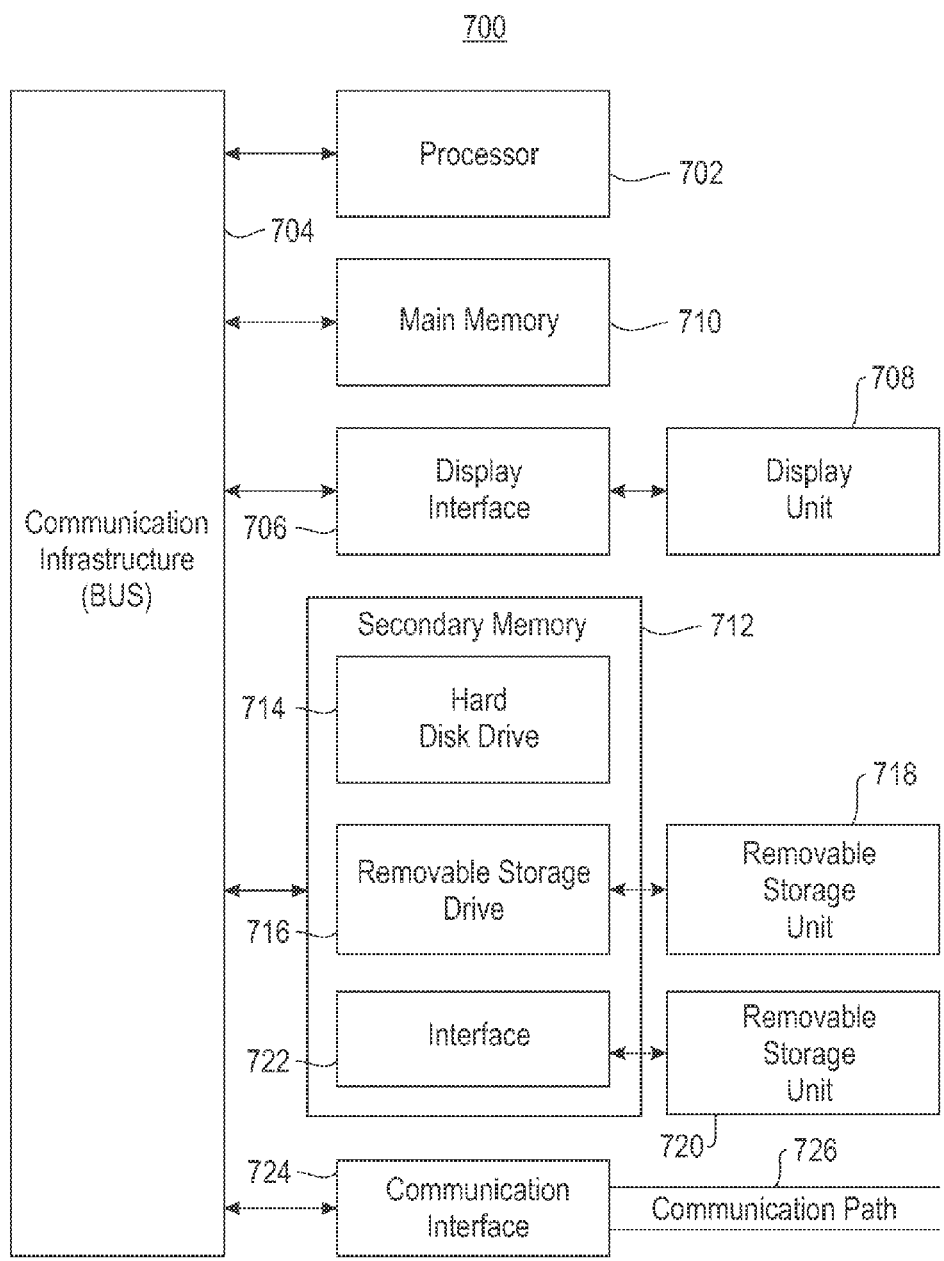
FIG. 7 is a block diagram showing a system for implementing an embodiment of the present invention.

Referring now to the block diagram of FIG. 7, additional details are now described with respect to implementing an embodiment of the present invention. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by removable storage drive (716). As will be appreciated, the removable storage unit (718) includes a computer readable medium having stored therein computer software and/or data.

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) is in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the code stream compression supports flexibility with respect to decompression, including, decompression of the code stream from an arbitrary position therein, with the decompression being a recursive process to the underlying literal of a referenced phrase.

Alternative Embodiment

It will be appreciated that, although specific embodiments of the invention have been described herein for purposes of illustration, various modifications may be made without departing from the spirit and scope of the invention. In particular, the migration may occur dynamically and/or concurrently with I/O operations and de-duplication processing. Accordingly, the scope of protection of this invention is limited only by the following claims and their equivalents.

We claim:

1. A storage system comprising:
   a first de-duplication domain and a second de-duplication domain, the first de-duplication domain having a first set of at least two sub-volumes and the second de-duplication domain having a second set of at least two sub-volumes;
   a processing unit to support migration of a third set of at least two sub-volumes into one of the first and second de-duplication domains, including:
      generation of a first content feature summary for the first set of sub-volumes, generation of a second content feature summary for the second set of sub volumes, and generation of a third content feature summary for the third set of sub-volumes, wherein generation of a content feature summary for a set of at least two sub-volumes comprises computing a union of individual content summaries associated with each sub-volume of the set;
      computation of a first content affinity between the first generated content feature summary and the third generated content feature summary, and computation of a second affinity between the second generated content feature summary and the third generated content feature summary; and
      selection of one of the first and second de-duplication domains for placement of the third set of sub-volumes based on comparison of the first and second content affinity.

2. The system of claim 1, further comprising migration of the third set of sub-volumes into the selected domain.

3. The system of claim 1, further comprising receiving data for storage in one of the sets of sub-volumes responsive to a write operation, processing the received data into a one or more data chunks, computing a fingerprint for each data chunk, and recording the fingerprint and an address for each data chunk in a fingerprint log.

4. The system of claim 3, wherein each generated content feature summary is a content filtered subset of fingerprints for an associated set of sub-volumes.

5. The system of claim 4, wherein the content filtered subset of fingerprints includes a selection of fingerprints in an interval associated with active data in a select set of sub-volumes.

6. The system of claim 4, further comprising re-assessment of the placement of the third set of sub-volumes to the selected domain, including identification of a non-selected de-duplication domain for re-assignment and computation of a change in de-duplication benefit with the re-assignment, and further comprising adjustment of the computed change to reflect migration cost.

7. A computer program product for computer simulation of domain placement selection, the computer program product comprising a computer readable hardware storage device having program code embodied therewith, the program code executable by a processor to:
   generate a first content feature summary for a first set of sub-volumes of a first de-duplication domain, a second content feature summary for a second set of sub-volumes for a second de-duplication domain, and a third content feature summary for a third set of sub-volumes, wherein each set of sub-volumes includes at least two sub-volumes, and wherein generation of a content feature summary for a set of sub-volumes comprises computing a union of individual content summaries associated with each sub-volume of the set;
   calculate a first content affinity between the first generated content feature summary and the third generated content feature summary, and a second content affinity between the second generated content feature summary and the third generated content feature summary; and
   select a domain placement for the third set of sub-volumes based on comparison of the first and second content affinity.

8. The computer program product of claim 7, further comprising program code to migrate the third set of sub-volumes into the selected domain placement.

9. The computer program product of claim 7, further comprising program code to receive data for storage in one of the sets of sub-volumes responsive to a write operation, process the received data into one or more data chunks compute a fingerprint for each data chunk, and record the fingerprint and an address for each data chunk in a fingerprint log.

10. The computer program product of claim 9, wherein each content feature summary is a content filtered subset of fingerprints for an associated set of sub-volumes.

11. The computer program product of claim 10, wherein the content filtered subset of fingerprints includes a selection of fingerprints in an interval associated with active data in a select set of sub-volumes.

12. The computer program product of claim 10, further comprising the program code to re-assess the placement of the third set of sub-volumes to the selected de-duplication domain, including program code to identify a non-selected de-duplication domain for re-assignment and the program to compute a change in de-duplication benefit with the re-assignment.

13. The computer program product of claim 12, further comprising the program to adjust the computed change to reflect migration cost.

* * * * *